(12) United States Patent
Meinecke et al.

(10) Patent No.: US 9,514,166 B2
(45) Date of Patent: Dec. 6, 2016

(54) FLEXIBLY PERFORMING ALLOCATIONS IN DATABASES

(71) Applicants: Johannes Meinecke, Dresden (DE); Gregor Hackenbroich, Dresden (DE); Lars Dannecker, Dresden (DE); Dave Parsons, Knutsford (GB); Paul Binks, Knutsford (GB); Simon Moscrop, Knutsford (GB); Jeremie Brunet, Boulogne-Billancourt (FR)

(72) Inventors: Johannes Meinecke, Dresden (DE); Gregor Hackenbroich, Dresden (DE); Lars Dannecker, Dresden (DE); Dave Parsons, Knutsford (GB); Paul Binks, Knutsford (GB); Simon Moscrop, Knutsford (GB); Jeremie Brunet, Boulogne-Billancourt (FR)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 14/259,911

(22) Filed: Apr. 23, 2014

(65) Prior Publication Data

US 2015/0154261 A1  Jun. 4, 2015

Related U.S. Application Data

(60) Provisional application No. 61/911,742, filed on Dec. 4, 2013.

(51) Int. Cl.
*G06F 17/30* (2006.01)

(52) U.S. Cl.
CPC ....... *G06F 17/303* (2013.01); *G06F 17/30339* (2013.01); *G06F 17/30498* (2013.01); *G06F 17/30507* (2013.01)

(58) Field of Classification Search
None
See application file for complete search history.

(56) References Cited

U.S. PATENT DOCUMENTS

| | | | | |
|---|---|---|---|---|
| 2010/0125565 A1* | 5/2010 | Burger | ............. | G06F 17/30433 707/713 |
| 2011/0167033 A1* | 7/2011 | Strelitz | ............. | G06F 17/30312 707/602 |

* cited by examiner

*Primary Examiner* — Hung Q Pham
(74) *Attorney, Agent, or Firm* — Mintz Levin Cohn Ferris Glovsky and Popeo, P.C.

(57) ABSTRACT

Allocation within a database environment is performed by processing a sequence of steps, each of which is described by an allocation processing block. The allocation processing block receives three inputs (input tables or input view) and computes a result. Related apparatus, systems, techniques and articles are also described.

18 Claims, 16 Drawing Sheets

Base / Result Tables 510

| Line Items (AO) | Resp. Center (OD) | Cost (Allocation Value) |
|---|---|---|
| Travel | B | 20000 |
| Salaries | A | 50000 |

Reference Table 520

| Line Items (AO) | Resp. Center (OD) | Activity (AO) | Driver (Driver Name) | Value (Driver Value) |
|---|---|---|---|---|
| Salaries | A | Shipping | Head count | 50 |
| Salaries | A | Admin | Head count | 50 |
| Salaries | A | Billing | Head count | 30 |

Allocation Paths Table 530

| Line Items (SAO) | Resp. Center (SOD) | Activity (TAO) | Resp. Center (TOD) | Driver (Driver Name) |
|---|---|---|---|---|
| Travel | B | Admin | B | NULL |
| Salaries | NULL | Shipping | A | Head count |
| Salaries | NULL | Admin | A | Head count |

Condition — Implication

NULL in condition column meaning: wildcard, matches for all resp. centers

NULL in target AO column meaning: wildcard, allocate to ALL activities

NULL in driver column meaning: don't use a driver, direct 100% assignment

Example of Algorithm Step 6 – Collect results

*FIG. 15*

FLEXIBLY PERFORMING ALLOCATIONS IN DATABASES

CROSS-REFERENCE TO RELATED APPLICATION

This application claims priority to U.S. Patent Application Ser. No. 61/911,742 filed on Dec. 4, 2013, entitled "Flexibility Performing Allocations in Databases", the contents of which are incorporated by reference herewith in its entirety.

TECHNICAL FIELD

The subject matter described herein relates to allocation processes, and specifically to data being aggregated within database environments.

BACKGROUND

In a database environment, allocation is the process of copying or splitting values obtained from source data into one or multiple values and storing them in target data. For example, one can allocate the cost of rent in an organization by splitting the total rent across departments, based on how much floor space they occupy. Allocation methods today require that specific data types and steps within an allocation process are hardcoded and limited to a predefined number of, or sequence of steps.

SUMMARY

In one aspect, a base table, a reference table, and an assignment path table are received. Subsequently, rules from the assignment path table are applied to the base table by splitting data from the base table into data requiring direct assignment and data requiring allocation. Furthermore, rules from the assignment path table are allied to the reference table and a filtered reference table is generated. The data requiring allocation using the filtered reference table is disaggregated. A results table is generated by combining the disaggregated data with the data requiring direct assignment.

The rules from the assignment path table that are applied to the base table can include joining the assignment paths rules table to the base table based on matching values in conditional columns in the base table and corresponding conditional columns in the assignment paths table. The rules from the assignment path table that are applied to the base table can also include adding a path identification (ID) column and a driver name column from the assignment paths table.

The values in the driver name columns determine the classification of data as data requiring direct assignment or data requiring allocation. The conditional columns in the base table can include a base allocation object column and a base other dimension column. The conditional columns in the assignment path rules table can include at least one of an allocation paths allocation object column and an allocation paths other dimension column.

The rules from the assignment path table that are applied to the reference table can include filtering out data records that do not meet filtering requirements. The rules from the assignment path table that are applied to the reference table can also include joining the assignment paths table to the reference table based on matching values in conditional columns in the reference table and corresponding conditional columns in the assignment paths table, and adding a path ID column from the assignment paths table.

The joining can uses a path-joining rule that includes prioritizing paths with more unique matches over paths with more wildcard matches. The rules from the assignment path table that are applied to the reference table can also include filtering out driver values that belong to target allocation objects that do not require disaggregation.

The conditional columns in the reference table can include a reference allocation object column, a reference other dimension column, and a reference driver name column. The columns in the assignment path rules table can include an assignment paths allocation object column, an assignment paths other dimension column, and an assignment paths driver name column.

The disaggregating the data requiring allocation using the filtered reference can include disaggregating, at least one allocation value from an allocation value column of the base table, into separate weighted components. The disaggregating is based on a weighted breakdown provided by the filtered reference table, and matching values in conditional columns in the base table and corresponding conditional columns in the filtered reference table. The weighted breakdown can be defined by values in a driver value column of the filtered reference.

Allocation within a database environment can be performed by processing a sequence of steps, each of which is described by a processing building block. The building block can receive three inputs (input tables or input view) and can compute a result. This result can act as the base input for the next step in the allocation. Related apparatus, systems, techniques and articles are also described.

Non-transitory computer program products (i.e., physically embodied computer program products) are also described that can store instructions, which when executed one or more data processors of one or more computing systems, can cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter allows for an arbitrary number of allocation steps. Moreover, dimensions that comprise the tables/views can be flexibly chosen. In other words, the number of steps and the dimensions may not be encoded rigidly into a specific computer program that is hard to change, but rather may be specified declaratively in an allocation model, which is executed with the help of a generic computer program as described in the following. As such, the method can generalize approaches used in state-of-the-art cost allocation solutions which are typically restricted to specific allocation models (e.g. activity-based costing) and which restrict the number and type of dimensions used in allocation.

The details of one or more variations of the subject matter described herein are set forth in the accompanying drawings

DESCRIPTION OF DRAWINGS

FIG. 5 is a diagram illustrating a base/result table, a reference table, and an allocation paths table;

Like reference symbols in the various drawings indicate like elements.

DETAILED DESCRIPTION

Figure 1:
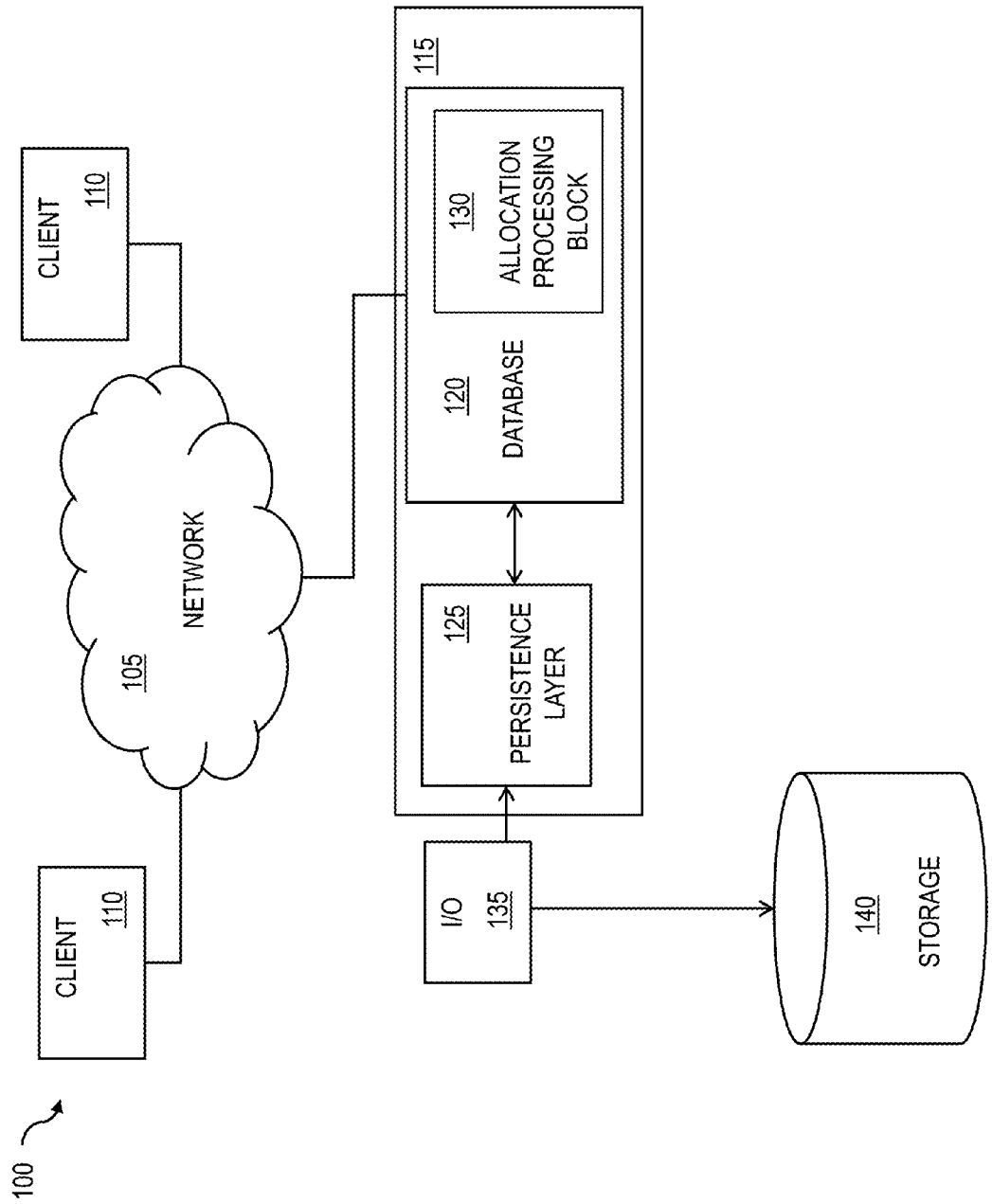
FIG. 1 is a system diagram illustrating a computing environment including a database having an allocation processing block.

FIG. 1 shows an example of a system 100 in which a computing system 115, can include one or more programmable processors that can be collocated, linked over one or more networks, etc., executes one or more modules, software components, or the like of a database 120. The database 120 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 115 as well as to remote users accessing the computing system 115 from one or more client machines 110 over a network connection 105. One or more user interface screens produced by the one or more first modules can be displayed to a user, either via a local display or via a display associated with one of the client machines 110. Data units of the database 120 can be transiently stored in a persistence layer 125 (e.g. a page buffer or other type of temporary persistency layer), which can write the data, in the form of storage pages, to one or more storages 140, for example via an input/output component 135. The one or more storages 140 can include one or more physical storage media or devices (e.g. hard disk drives, persistent flash memory, random access memory, optical media, magnetic media, and the like) configured for writing data for longer term storage. It should be noted that the storage 140 and the input/output component 135 can be included in the computing system 115 despite their being shown as external to the computing system 115 in FIG. 1.

Data retained at the longer term storage 140 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

The database 120 can include an allocation processing block 130. The current subject matter describes methods, systems, and computer program products for performing allocation within a database using the allocation processing block 130. Allocation is the process of copying, splitting and/or disaggregating values obtained from source data into one or multiple values and storing them in target data. For example, in order to generate accurate financial statements broken down to the department level, one can allocate the cost of rent in an organization by splitting the total rent across departments, based on how much floor space they occupy. Organizations can use allocation calculations to analyze operational data and to provide insight and information on performance management, shared services costing, planning and budgeting cycles, cost reduction initiatives, sales and marketing strategies, product mix simulations, regulatory reporting, and the economic performance of organization units.

The current subject matter is not restricted to costs, and may also be used to allocate values representing e.g. volume, mass, energy-content, etc. The current subject matter is thus not restricted to business scenarios related to profitability and costing, but can also be used in industrial scenarios requiring resource and material allocation (e.g. in oil and gas scenarios).

Activity-based costing is a standard methodology in profitability and cost analysis. In activity-based costing, costs are usually allocated from line items to activities, and then from activities to cost objects. The current subject matter can support activity-based costing, which may include models where costs are allocated through an arbitrary number of steps.

Figure 2:
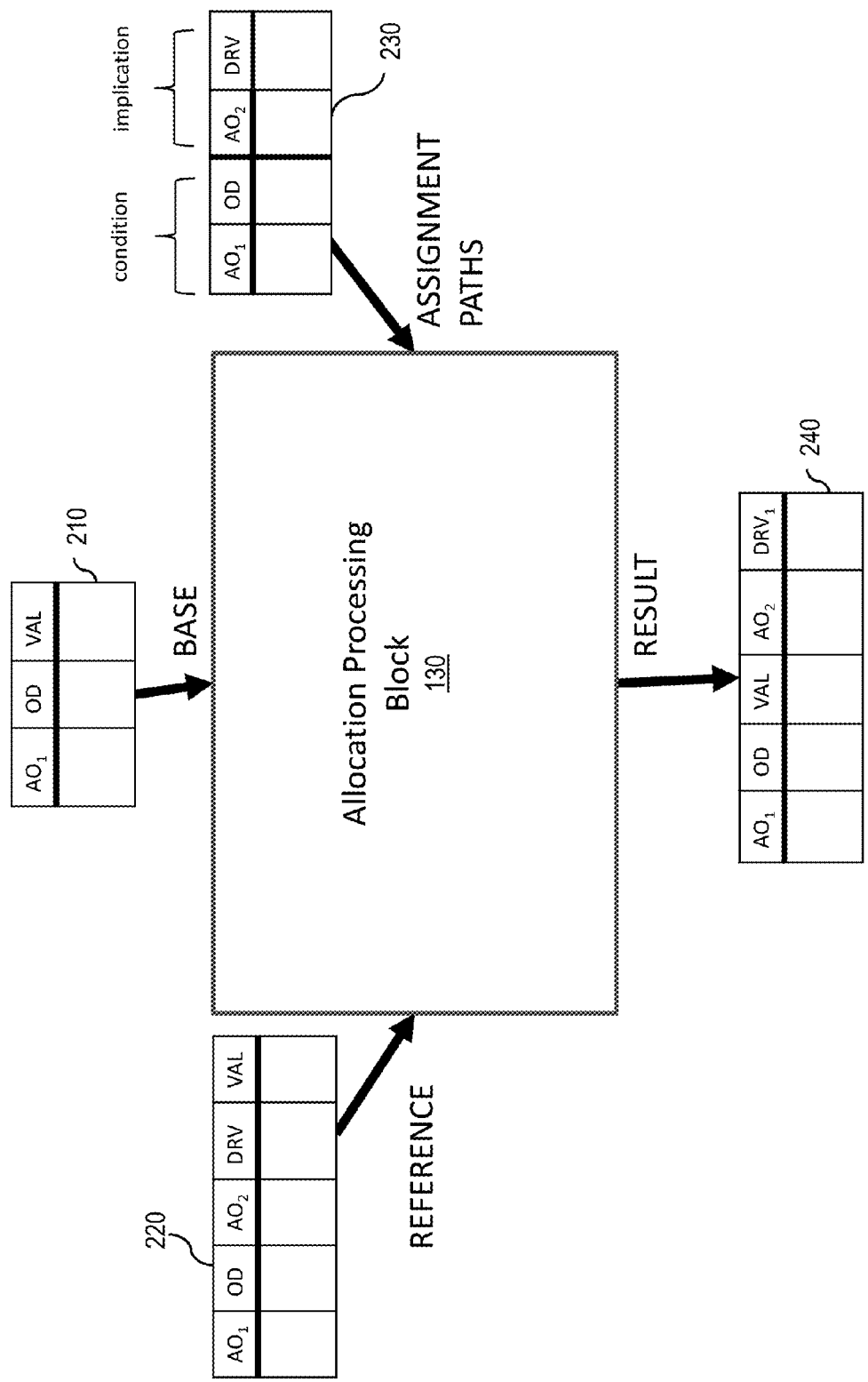
FIG. 2 is a diagram illustrating an allocation processing block 130 that receives three inputs and computes an allocation result.

FIG. 2 is a diagram illustrating an allocation processing block 130 that can receive three inputs and can compute an allocation result 240. The three inputs can include a base 210, a reference 220, and an assignment paths table 230, and they can provide data to the allocation processing block 130 in the form of input tables or input views. The base 210 can be the primary or source input table, which the allocation processing block 130 copies, splits and/or aggregates with the additional use of the reference table 220 and the assignment paths table 230. The base table 210 can list costs by line items, which may need to be broken down by the processing block. The reference table 220 can provide key relative parameters within an organization that can be used as weights for allocation, for example activities performed by different departments, or activities performed to sell different products, headcount distributed with the organization, or resource consumption in different builds. These weights can be called drivers, and are used to breakdown according to the driver proportions the parameters that may require allocation from the base table 210. When there are more than one driver, the assignment paths table 230 can be used to facilitate the allocation. The reference table 220 can contain additional parameters that can be used when the assignment paths are evaluated. The assignment paths table 230 can be a set of rules that the allocation processing block 130 applies to the base table 210 and the reference table 220, in order to know which parameters to choose for the classifying, copying, splitting, and/or disaggregating activities that it performs. For example, rent costs for the year to date can be allocated to warehouses B and C, and they can be distributed according to the square footage measurement of the respective warehouses.

In an example embodiment, allocation models can be created to determine how costs are apportioned across an organization. The basic building block of an allocation model is the allocation processing block 130.

Figure 3:
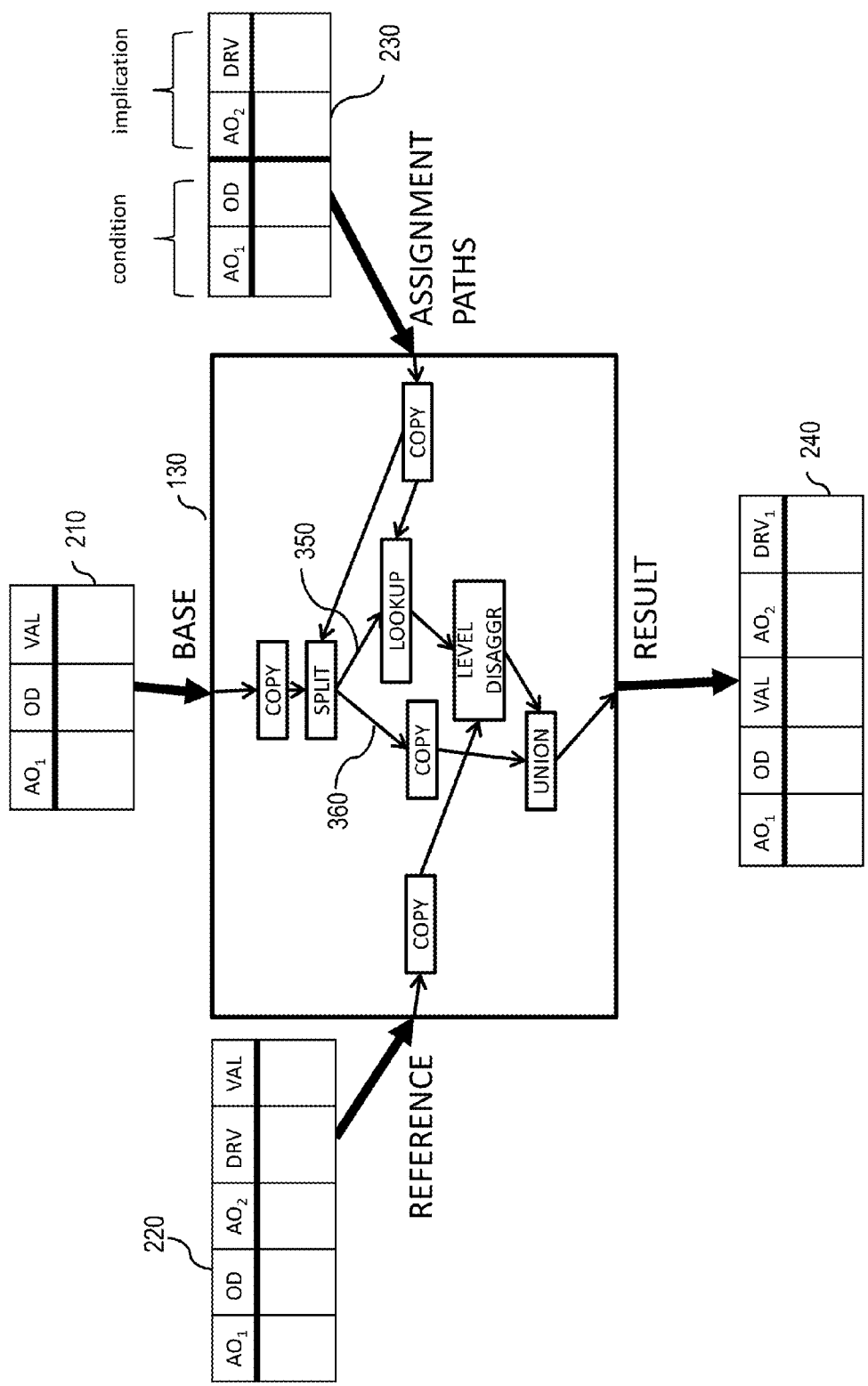
FIG. 3 is diagram illustrating an example of a sequence of activities within the allocation processing block.

FIG. 3 is a diagram illustrating an example of a sequence of activities within the allocation processing block 130. This example illustrates how the allocation processing block 130 can differentiate between data requiring disaggregation, and data not requiring disaggregation. In the cases where data may not require disaggregation, the entire allocation value can be assigned to a specific allocation object. The allocation processing block 130 can receive data from the base table 210, then can copy this data, and split the data based on rules from the assignment paths table 230. The splitting activity can yield two paths, namely a disaggregation path 350, and a direct assignment path 360. In the disaggregation path 350 the rules from the assignment path table can be applied to the data requiring allocation, as shown by the lookup activity, and then the data can be disaggregated. In the direct assignment path 360, the data from the base table 210 can be copied and combined with the disaggregated data. The combined data results can then be fed into the results table 240.

The base table 210, reference table 220, allocation paths table 230 and results table 240 can include parameters of different data types, which can include allocation objects, dimensions, values, and drivers, as defined below.

Allocation Object (AO)—An allocation object represents a business entity to which values can be allocated. For example, line items, activities, and cost objects. In allocation, the source and target objects are called allocation objects.

Allocation value (VAL)—An allocation value is the actual numeric value to be allocated. For example, in the example about rent, the source allocation object is the Rent item, and the allocation value is the numeric value of the rent, say $10,000. The allocation value is usually a cost, but it can also be revenue, or other value parameters.

Dimension or other dimension (OD)—A dimension is a collection of related data members that represent an aspect of a business, such as products, accounts, or currency. Dimensions can be allocation objects or other dimensions. Whereas an allocation object represents a business entity to which a value can be allocated, an other dimension (OD) is a dimension by which the allocated value should be analyzed, but which is not considered as an allocation object in that it does not represent an entity that carries costs, for example time. Other dimensions are hierarchical attributes that are used to specify allocation objects in more detail.

Driver (DRV)—A driver is a measure used to split an allocation value across allocation objects. It is a ratio used as a weighted distribution to apply for the disaggregation of data. For example, if the total cost of rent for an organization was apportioned to departments according to how much floor space they occupy, the driver in this case would be the square meters measurement of the different departments relative to each other.

The above-defined parameter types can be stored in corresponding columns types. As shown in FIG. 3, the base table 210, reference table 220, assignment path table 230, and results table 240 can include columns AO1, OD, VAL, AO2, DRV to store the corresponding allocation object, other dimension, value, and driver parameters. It is understood that the list columns are provided as an example, and that the list is not limited to the number, or type of columns described.

It is understood that described subject manner can be intended for flexible design thereby allowing for an arbitrary number of Allocation Objects (AO) columns, Other Dimension (OD) columns or drivers, and that the data types described can span over many different industries.

Figure 4:
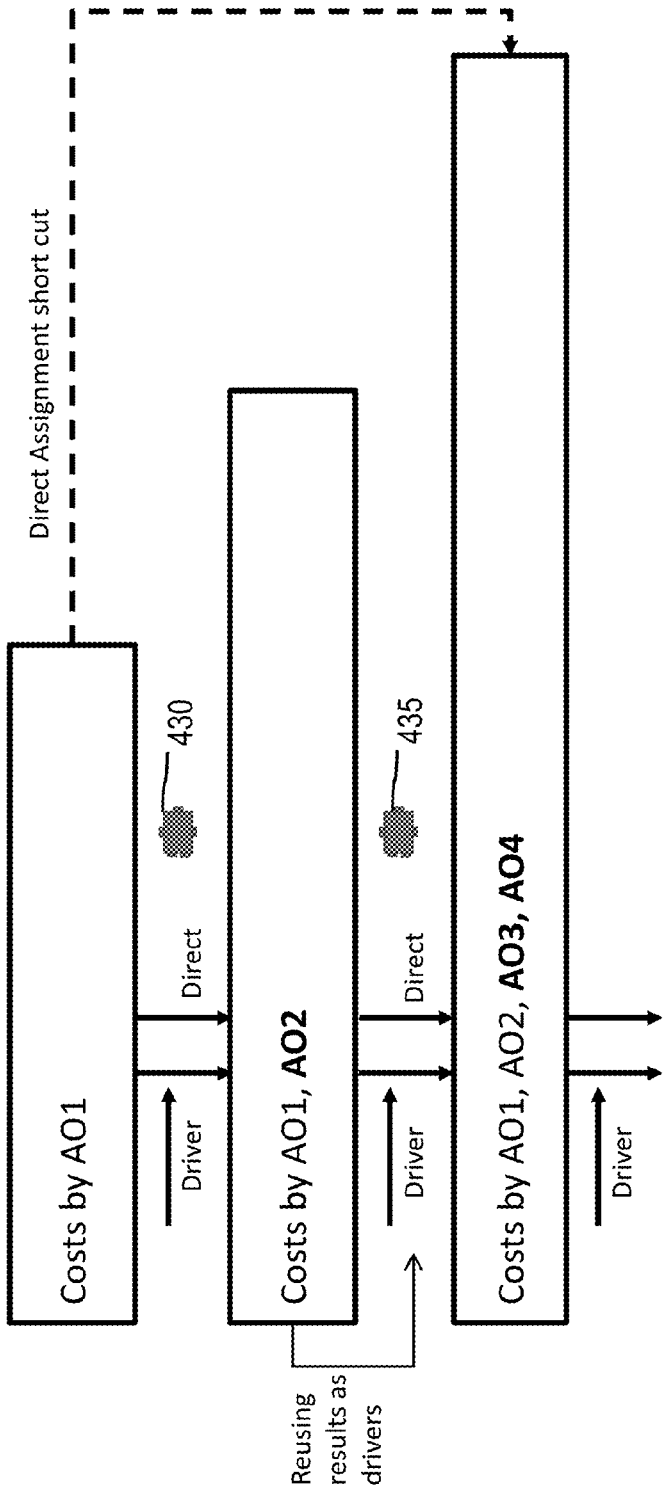
FIG. 4 is a diagram illustrating the allocation processing block used twice to further disaggregate an allocation value by other allocation object parameters.

FIG. 4 is a diagram illustrating the allocation processing block used twice to further disaggregate an allocation value by other allocation object parameters. The first instance of the allocation processing block 430 can receive an allocation value associated with an allocation object AO1. Using a driver and a second allocation object AO2 (provided by a reference table) and rules (provided by an assignment paths table), the value associated with AO1 can be disaggregated, generating a results table with the AO1, A02, the disaggregated values and the driver. The second instance of the allocation processing block 435 can re-use the results from the prior step as an input driver, along with additional two additional allocation objects AO3 and AO4. The initial allocation value that was associated with the allocation object AO1 can be further disaggregated based on the new driver and allocation objects AO3 and AO4. This macro-view illustrates an ordered sequence of steps where an allocation processing block can be implemented as a black box, where each level can add one or more allocation object dimensions. This example requires that an additional allocation object dimension can be provided, and that a new reference table can be provided within the sequence. It is noted that data that can be directly assigned, hence not requiring disaggregation can optionally skip direct assignment steps within a sequence of allocation processing block activities, and can be directly assigned to a final results table at the end of the sequence described.

FIG. 5 is a diagram illustrating a base/result table 510, a reference table 520, and an allocation paths table 530. The base/result table 510 can include the Allocation Object (AO), Other Dimension (OD) and Allocation value (VAL) column types. The allocation value can be the primary input for the allocation process, and it can be split by allocation objects and other dimensions. All subsequent allocation steps can use the results of the previous step as base data or reference data. A base table can contain the values to be allocated (usually costs) listed by the objects to which they already have been allocated and possibly by other dimensions. For example, the base table 510 with costs broken down by line items "travel" and "salaries." The parameters in the other dimensions column are hierarchical attributes that can be used to specify allocation objects in more detail. They should be kept in the final results table for reporting.

The reference table 520 can include Driver Name, and Driver Value columns as weights to be used for allocation. Reference table 520 can also include one or more Allocation Object (AO) columns, and may optionally include Other Dimension (OD) columns. The driver values in the Driver Value columns are split across, and using the values contained in the Allocation Object (AO) columns and Other Dimension (OD) columns. The driver name column in this example contains the "head count" parameter, and the driver value column contains the numeric value used as a weight. The reference table 520 can be used as an input for the allocation process, and the values of all relevant drivers can be used as weights for allocating the allocation values (e.g. costs), listed by various dimensions.

The assignment paths table 530 is an ordered list of "rules" specifying, based on a given combination of dimension values (the condition), which driver to choose to disaggregate to which AOs, or to which AOs to directly assign to the results table, or optionally which OD assignments to change. The assignment paths table 530 can include one or more condition columns defining dimensions, shown as a source allocation object (SAO) and a source other dimension (SOD) column. The assignment paths table 530 can also include a driver name column, one or more target allocation object columns (TAO), and zero or more target other dimension columns (TOD).

Source columns can refer to where the AO or OD values come from, and can contain these values before an allocation activity is performed. For example source columns can contain the dimension values in the base table, and the condition values in the assignment paths table. Target columns refer to AO or OD values where the costs can go after an allocation activity is performed. For example, target columns can contain the dimension values in the reference table and the implication values in the assignment paths table.

NULL values in source and target columns of the allocation paths table 530 can act like wildcards, meaning that any value could be considered in the NULL fields. Contrarily, a NULL in the driver name column means that a driver should not be used, and that the data in the record should be directly assigned one single dimension combination, and does not require any allocation or driver-based disaggregation, as was described with reference to paths 350 and 360 in FIG. 3.

Figure 6:
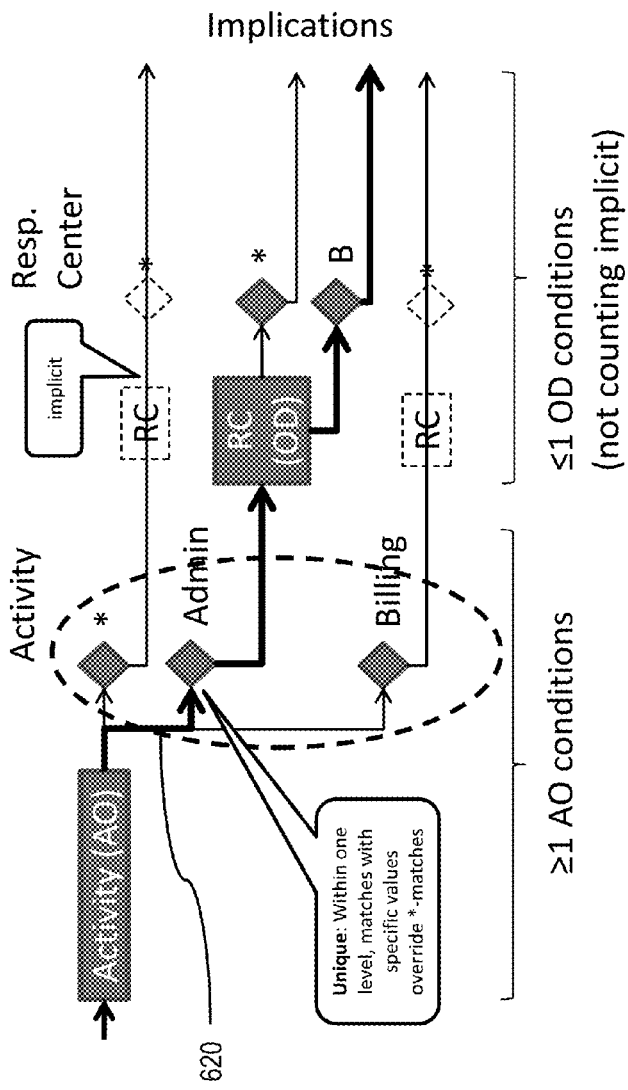
FIG. 6 is a diagram illustrating a tree approach for interpreting assignment path rules, especially how to handle NULL values in the assignment path table.

FIG. 6 is a diagram illustrating a tree approach for interpreting assignment path rules, especially how to handle NULL values in the assignment path table. Understanding this approach is necessary for understanding the sequence of steps and substeps that the allocation processing block 130 can implement in performing allocation, as will be described in FIGS. 7-16. Assignment path table 610 contains NULL values in the SAO, SOD, and driver name columns. The tree diagram shows the four potential paths due to the NULL values in assignment path table 610. However, an additional rule dictates that within each level, matches with specific values can override wildcard matches. Hence, the wildcard can apply only to values that have not already been accounted for by a unique match. Following this rule, as illustrated in this example, path 620 is the correct path, since it is the path with the most unique matches defined.

Figure 7:
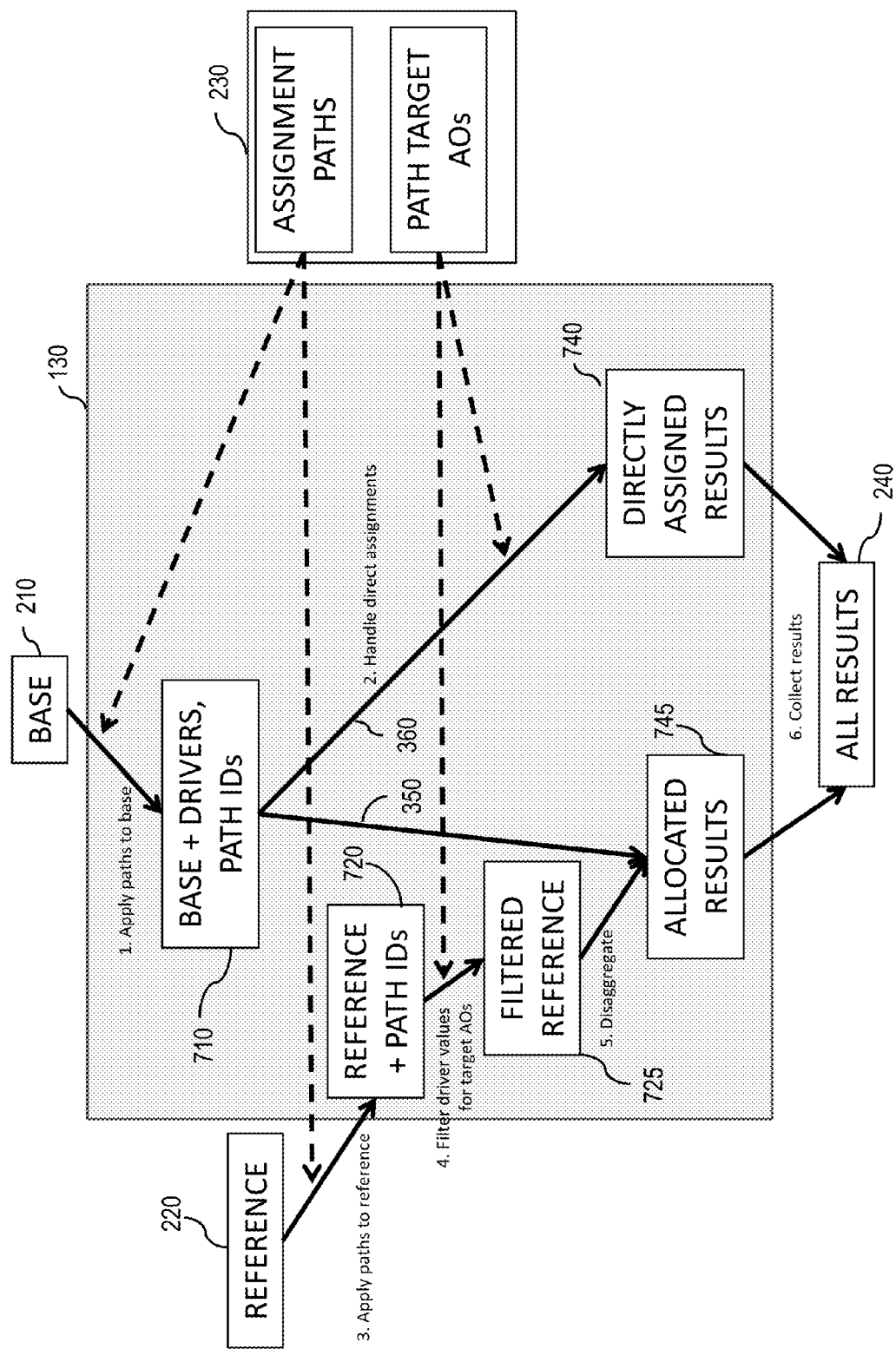
FIG. 7 is a process flow diagram illustrating a sequence of steps performed by the allocation processing block.
Figure 8:
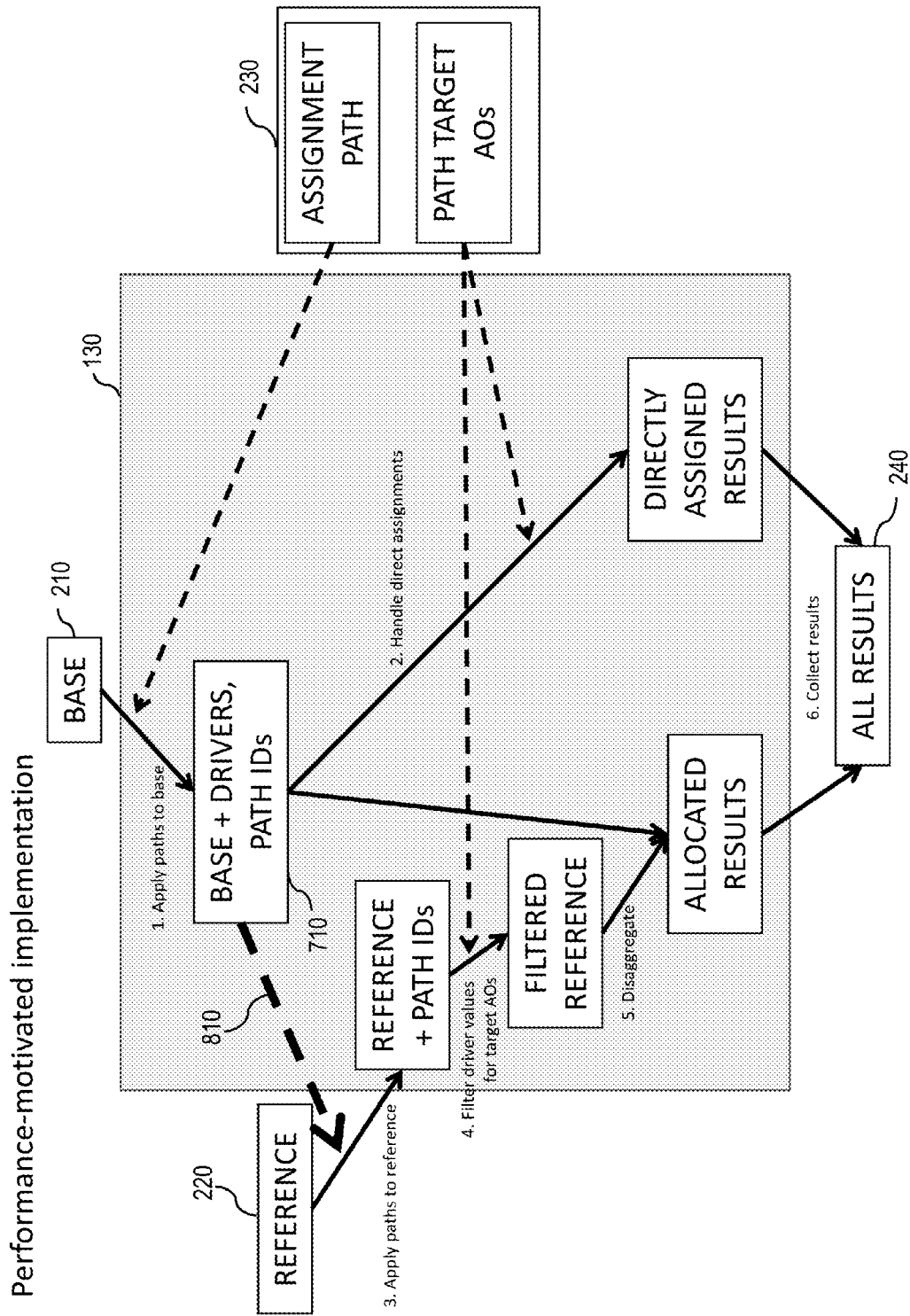
FIG. 8 is a process flow diagram similar to FIG. 7, with an adapted performance motivated step.
Figure 9:
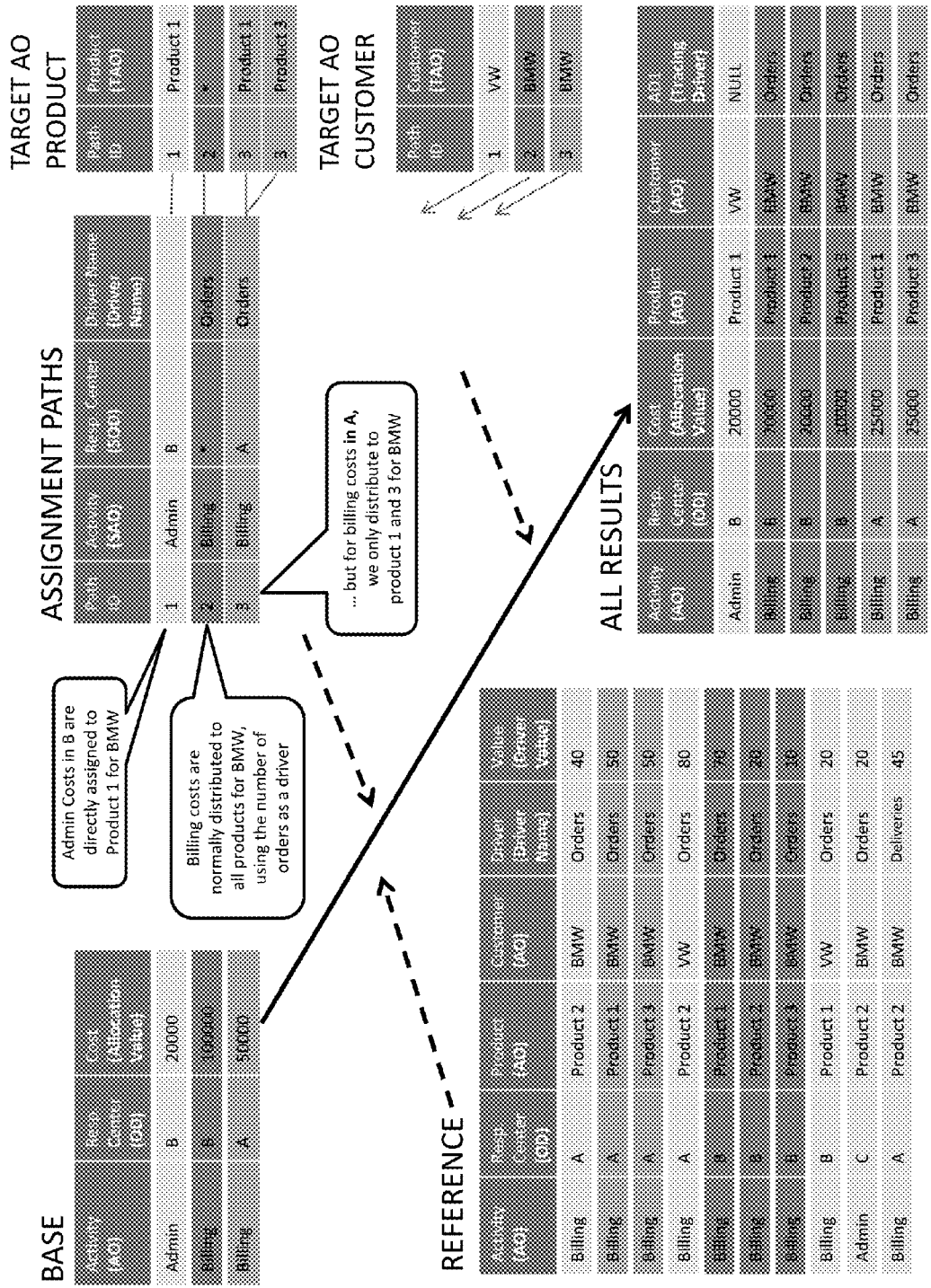
FIG. 9 is a diagram illustrating an example of the results of the allocation process implemented on data populated base, resource, assignment paths and results tables; allocation process using data populated tables.

FIG. 7 is a process flow diagram illustrating a sequence of steps (e.g. implemented as relational database operations like JOIN, UNION, vendor-specific extended operations etc.) that can be performed by the allocation processing block 130. FIG. 8 is a process flow diagram similar to FIG. 7, with an adapted performance motivated step. FIG. 9 is a diagram illustrating an example of the results of the allocation process that can be implemented on data populated base, resource, assignment paths and results tables. Note that Assignment paths table in FIG. 9 includes the Target AO Product, and the Target AO Customer tables, even though they are shown as separate tables. This illustrates that the assignment paths table can include multiple target allocation objects. In a single allocation step, values can be split to a single target AO or to multiple target AOs. FIGS. 10-15 are diagrams, each illustrating a step or sub-step of FIG. 7 to achieve the result shown in FIG. 9, performed by the allocation processing block 130.

Figure 10:
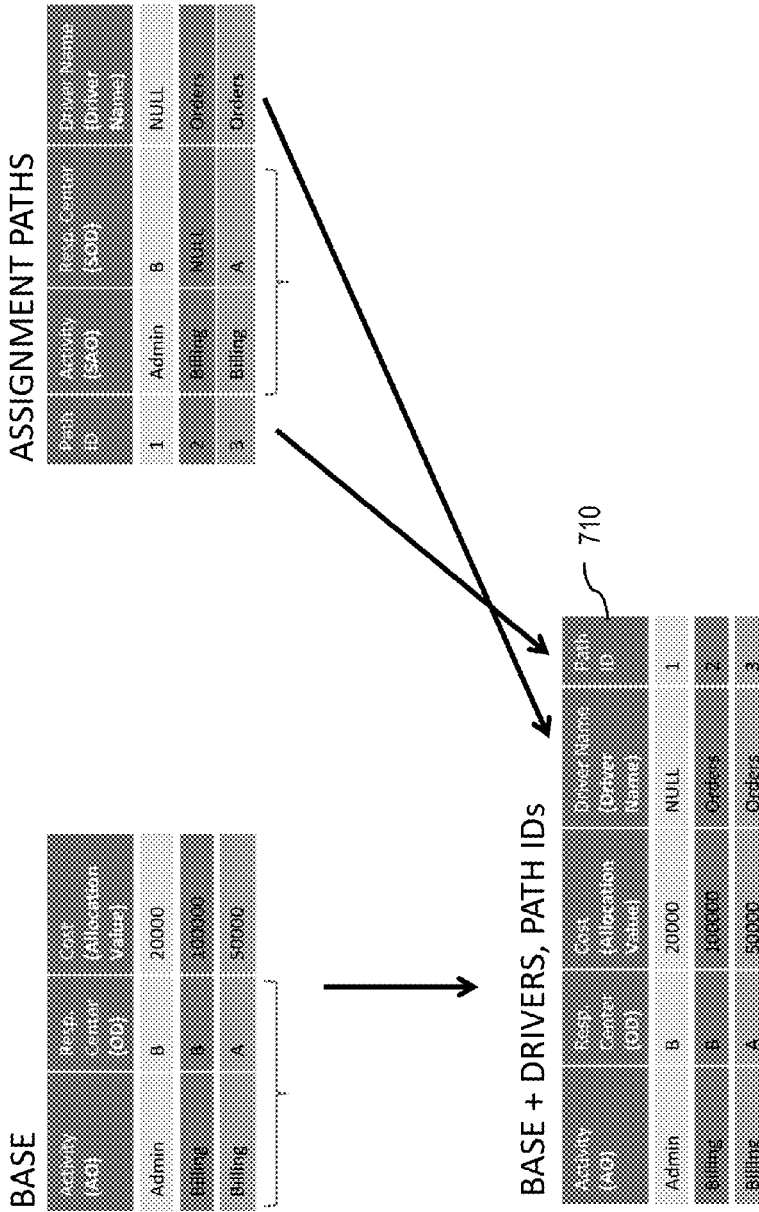

Referring to FIG. 7, the allocation processing block 130 can receive base table 210, reference table 220, and assignment path table 230. Note that the assignment path table 230 may include a separate path target table. The assignment paths table 230 can be applied to the base table 210 and can generate and intermediary base table 710. FIG. 10 illustrates this step with data populated tables. The assignment paths table can be joined to the base table on all condition columns, and adds the Path ID and Driver Name columns. This join takes into account wildcard-semantic of NULL as previously described. Therefore, path 3 overrides path 2, because path 3 is more specific. The NULL value in the Driver Name column of the intermediary 710 identifies the data records that should be directly assigned to the results table, without need for disaggregation.

Figure 11:
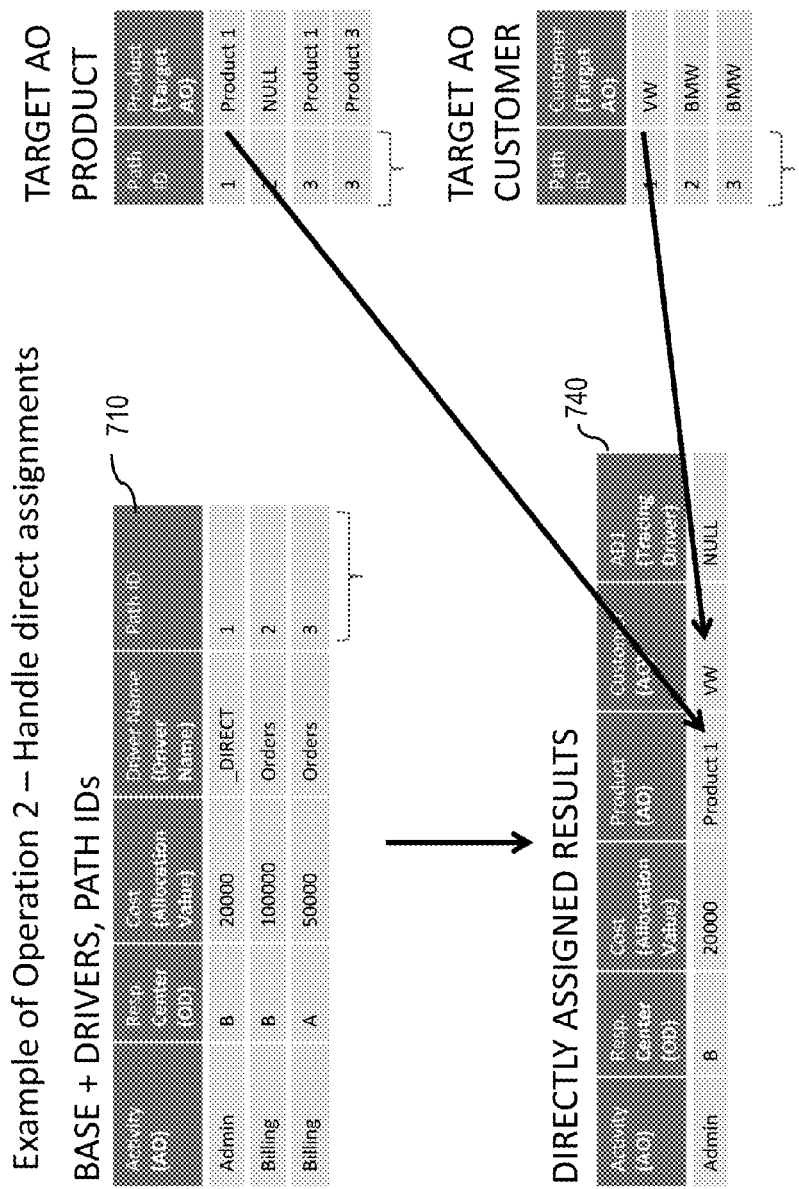

Referring back to FIG. 7, the allocation processing block 130 can use the NULL value to split the data from the base table 210 accordingly into data requiring disaggregation 350, and data requiring to be directly assigned 360. The allocation processing block 130 can direct the data requiring direct assignment 360 to the results table via a first intermediary results table 740. FIG. 11 illustrates this step with data populated tables. For all target Allocation Object columns of the assignment paths table, the allocation processing block 130 can join the target AO (one per base row) to those rows of the extended base table that have no driver name specified, but instead have "NULL" specified. Essentially copying the all records that contain the "NULL" driver name directly to the results table.

Figure 12:
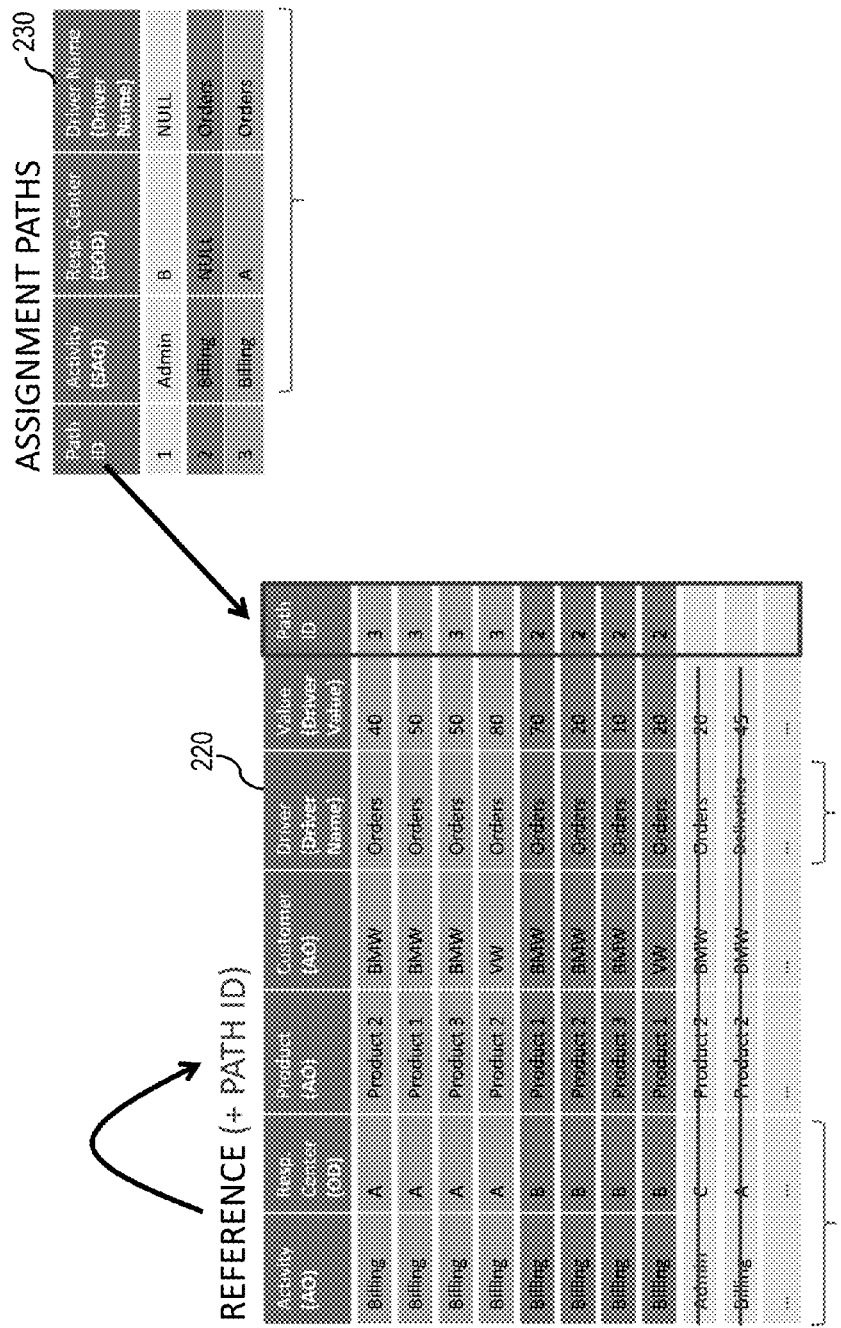

Referring back to FIG. 7, the allocation processing block 130 can apply assignment paths table 230 to reference table 220, and can generate intermediary reference table 720. FIG. 12 illustrates this step with data populated tables. The allocation processing block 130 can join the assignment paths table 230 to the reference table 220 on all condition columns and on the driver name, and can add the Path ID. This step can effectively filter out unneeded AO-OD-Driver combinations. The join is a path-join, which means that it can take into account the wildcard-semantic of NULL values as previously discussed. Therefore, path id 3 overrides path id 2, because path id 3 is more specific.

Figure 13:
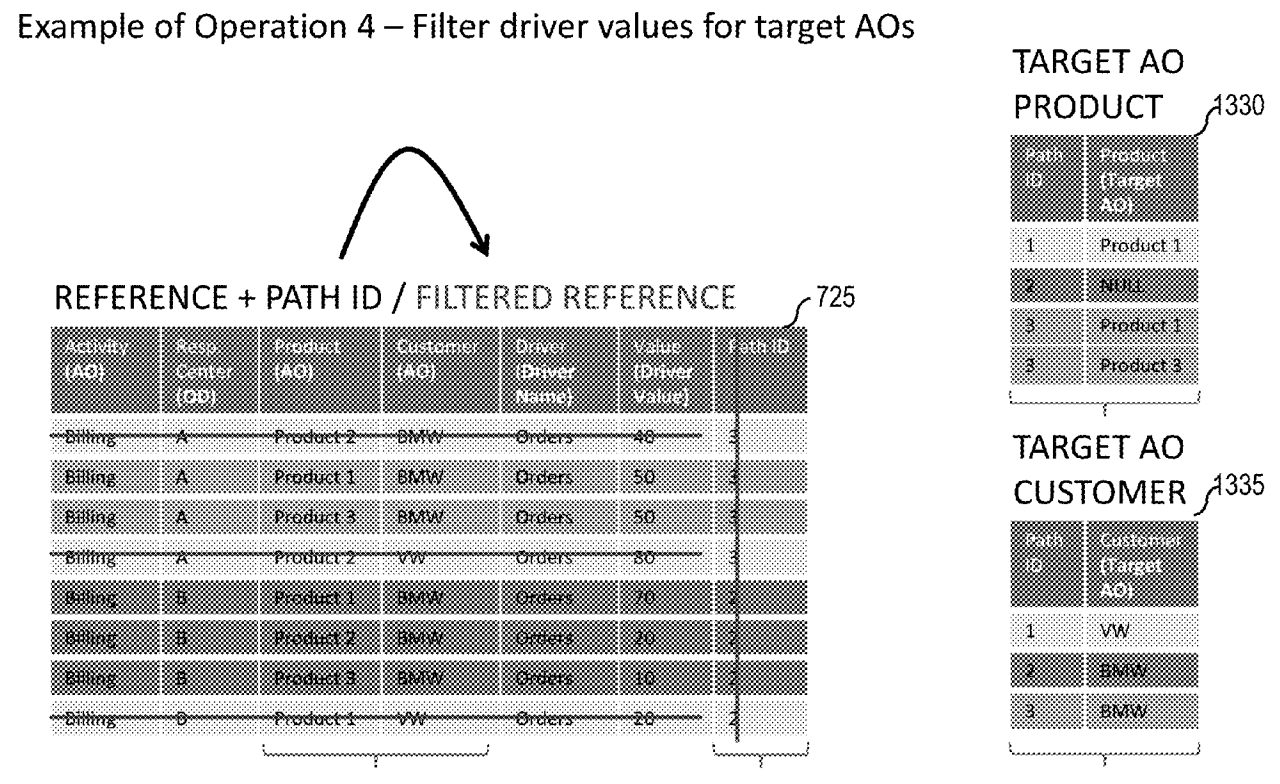

Referring back to FIG. 7, the allocation processing block 130 can further apply assignment paths table 230 to reference table 220, and can generate a filtered reference table 725. FIG. 13 illustrates this step with data populated tables. Note that the Target AO Product table 1330 and the Target AO Customer table 1335 are a part of the assignment paths table (not shown), even though they are shown as separate tables. The allocation processing block 130 can filter out driver values that belong to target AOs which the rules identify should not be disaggregated. This step can effectively be performed by joining the target AO tables 1330 and 1335 of the assignment paths to the reference table 725, based on the target AO and the Path ID columns. For example, the Target AO Customer table 1335 does not contain a path ID of value 2 with Customer VW, therefore the last line of the intermediary reference table 725 can be filtered out. As discussed above, during the join, the wildcard-semantic of NULL can be taken into account, and the more unique path 3 overrides the less unique path 2.

Figure 14:
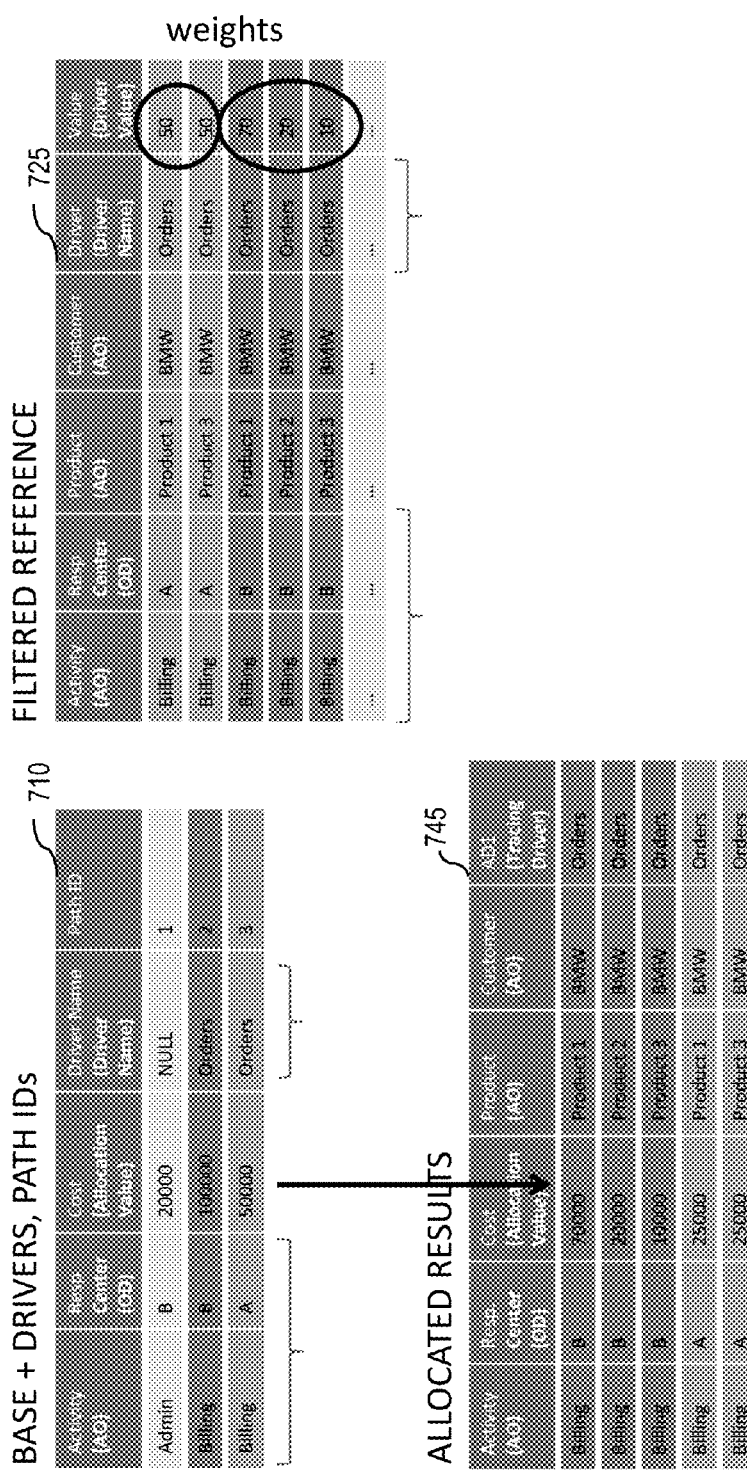

Referring back to FIG. 7, the allocation processing block 130 can disaggregate the data requiring allocation, using the filtered reference table 725. The disaggregated results can be placed in a second intermediary results table 745. FIG. 14 illustrates this step of generating a second intermediary results table 745, with data populated tables. The allocation processing block 130 can disaggregate the allocation value from the intermediary base table 710, using the driver values from the filtered reference table 725. The driver values can provide the weights, or the proportions/ratios into which the allocation processing block 130 can disaggregate the allocation value.

Figure 15:
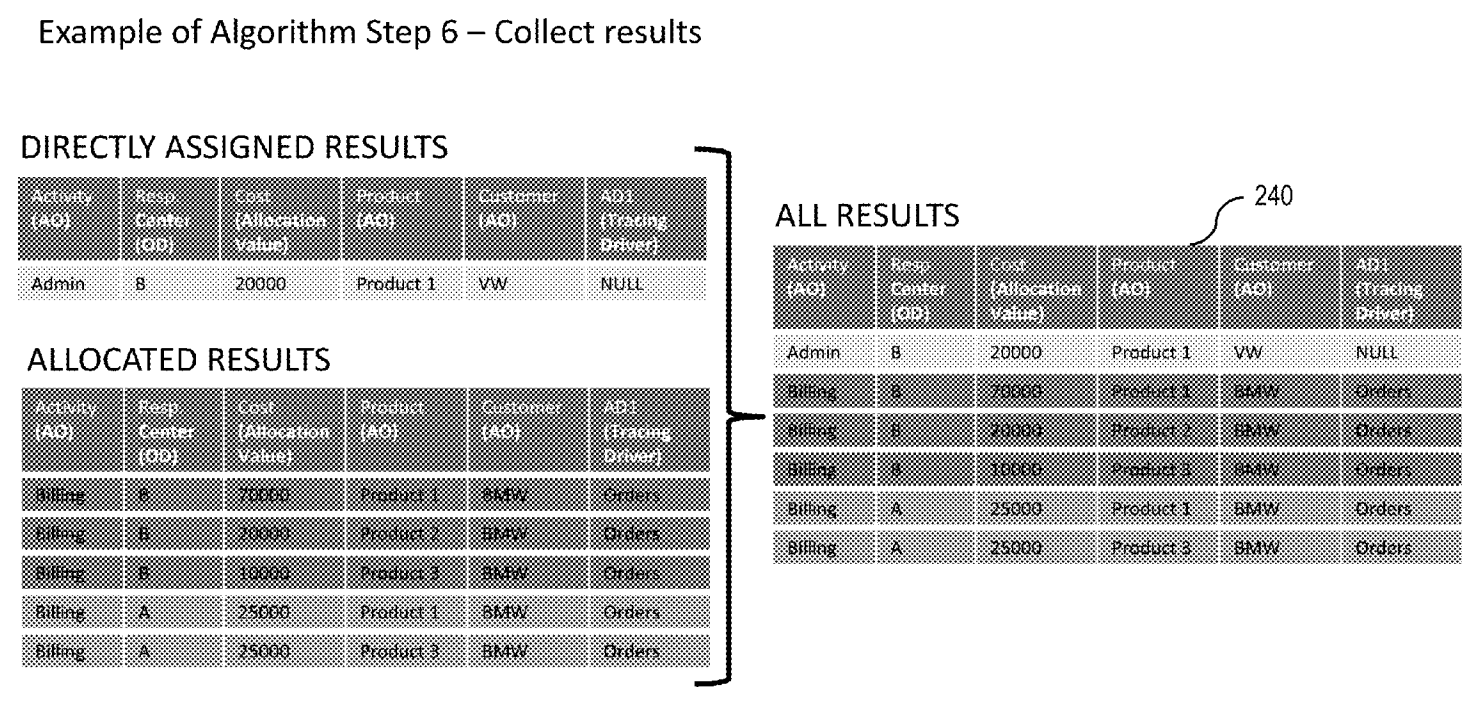

Referring back to FIG. 7, the allocation processing block 130 can combine the disaggregated data from the second intermediary results table 745, with the directly assigned data from the first intermediary results table 740, and can generate a results table 240. FIG. 15 illustrates this step with data populated tables. The allocation processing block 130 can perform a union of the disaggregated results and the directly assigned results, forming the results table 240. The results table produced can include the allocated values, (potentially) all allocation objects—both source and target, any other dimensions, as well as the drivers.

Referring to FIG. 8, the allocation processing block 130 can optionally improve performance by joining, 810, the intermediary base table 710 with the reference table 220. This is an alternative method of applying the rules from the assignment path table 230 to the reference table 220, and is technically feasible because the intermediary base table 710 contains the same information, but already filtered and without wildcards, which is better for performance.

The join logic, as described in individual examples, can be summarized in the following manner. In general, two dimension columns types can be used as join attributes, specifically if they refer to the same dimension, or they have the same role in their table (e.g. both refer to the allocation source). In the base table, all dimensions can be considered to be source dimensions. In the assignment paths table, condition tables are generally source dimension columns and implications columns are generally target dimension columns. If a dimension only appears as a condition, then it can be considered to be both in source and target role (because in that case the assignment to this AO and OD does not change). In the reference table, dimensions are target dimension columns.

Figure 16:
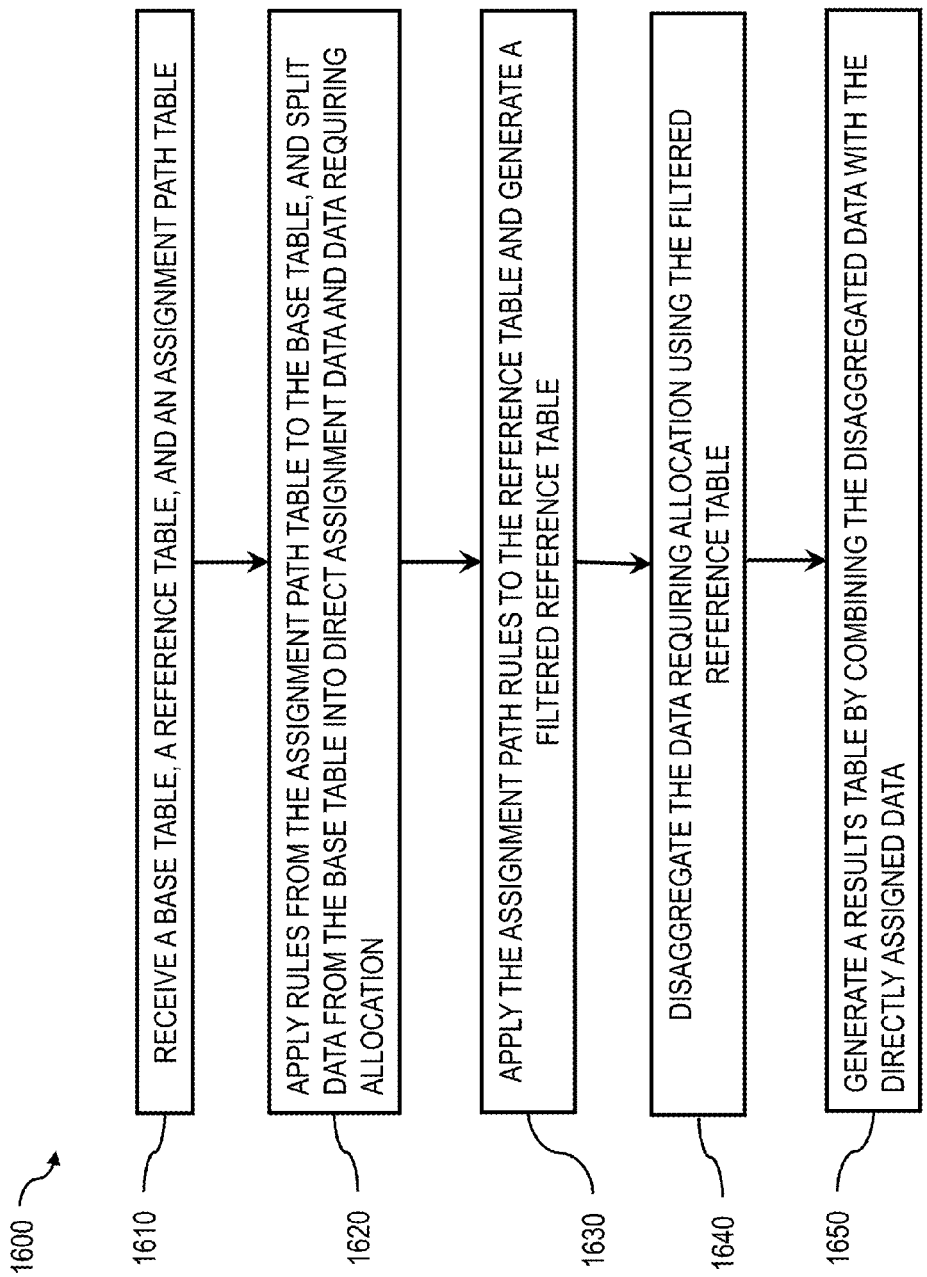
FIG. 16 is a process flow diagram illustrating a sequence of activities for performing data allocation.

FIG. 16 is a process flow diagram 1600 in which, at 1610 the allocation processing block can receive a base table, a reference table, and an assignment path table. Subsequently, at 1620, the allocation processing block can apply rules from the assignment path table to the base table, and can split data from the base table into direct assignment data and data requiring allocation. Subsequently, at 1630, the allocation processing block can apply the assignment path rules to the reference table and can generate a filtered reference table. Subsequently, at 1640, the allocation processing block can disaggregate the data requiring allocation using the filtered reference table. Subsequently, at 1650, the allocation processing block can generate a results table by combining the disaggregated data with the directly assigned data.

To increase the performance of the allocation algorithm, the operations in allocation can be performed close to the data and in-memory (as part of an in-memory database platform). In one implementation, allocations can be executed by running operations within, for example, the EPM platform of the SAP HANA database platform.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   applying rules from an assignment paths table to a base table, the applying comprising:
   joining the assignment paths table to the base table to generate an intermediary base table, the joining based on matching values in conditional columns in the base table and corresponding conditional columns in the assignment paths table;
   splitting data from the intermediary base table into data requiring direct assignment and data requiring allocation; and
   adding a path identification (ID) column and a driver name column from the assignment paths table;
   applying rules from the assignment paths table to the reference table and generating a filtered reference table;
   disaggregating the data requiring allocation using the filtered reference table; and
   generating a results table by combining the disaggregated data with the data requiring direct assignment;
   wherein at least one of the receiving, applying, disaggregating, or generating is implemented by at least one data processor.

2. The method as in claim 1, wherein the values in the driver name column identifies a driver that indicates whether the data requires direct assignment or allocation.

3. The method as in claim 1, wherein the conditional columns in the base table comprise at least one of:
   a base allocation object column or a base other dimension column,
   wherein the conditional columns in the assignment paths table comprise at least one of: an allocation paths allocation object column and an allocation paths other dimension column.

4. The method as in claim 1, wherein applying rules from the assignment paths table to the reference table comprises filtering out data records that do not meet filtering requirements.

5. The method as in claim 4, wherein the conditional columns in the reference table comprise at least one of:
   a reference allocation object column;
   a reference other dimension column; or
   a reference driver name column.

6. The method as in claim 4, wherein the conditional columns in the assignment paths table comprise at least one of:
   an assignment paths allocation object column;
   an assignment paths other dimension column; or
   an assignment paths driver name column.

7. The method as in claim 1, wherein the disaggregating the data requiring allocation using the filtered reference table comprises:
   Disaggregating at least one allocation value from an allocation value column of the base table into separate weighted components, and
   wherein the disaggregating is based on a weighted breakdown provided by the filtered reference table, and matching values in conditional columns in the base table and corresponding conditional columns in the filtered reference table.

8. The method as in claim 7, wherein the weighted breakdown is defined by values in a driver value column of the filtered reference table.

9. A method comprising:
   applying rules from an assignment path table to a base table, the applying comprising:
   joining the assignment paths table to a reference table to generate an intermediary reference table, the joining based on matching values in conditional columns in the reference table and corresponding conditional columns in the assignment paths table;
   splitting data from the base table into data requiring direct assignment and data requiring allocation; and
   adding a path ID column from the assignment paths table;
   applying rules from the assignment paths table to the intermediary reference table and generating a filtered reference table;
   disaggregating the data requiring allocation using a filtered reference table; and
   generating a results table by combining the disaggregated data with the data requiring direct assignment;
   wherein at least one of the receiving, applying, disaggregating, or generating is implemented by at least one data processor.

10. The method as in claim 9, wherein the joining uses a path-joining rule comprising prioritizing paths with more unique matches over paths with more wildcard matches.

11. The method as in claim 9, wherein applying rules from the assignment paths table to the intermediary reference table comprises filtering out driver values that belong to target allocation objects that do not require disaggregation.

12. A non-transitory computer program product storing instructions which, when executed by at least one data processor forming part of at least one computing system, result in operations comprising:
   applying rules from an assignment paths table to a base table, the applying comprising:
   joining the assignment paths table to the base table to generate an intermediary base table, the joining based on matching values in conditional columns in the base table and corresponding conditional columns in the assignment paths table;
   splitting data from the intermediary base table into data requiring direct assignment and data requiring allocation; and
   adding a path identification (ID) column and a driver name column from the assignment paths table;
   applying rules from the assignment paths table to the reference table and generating a filtered reference table;
   disaggregating the data requiring allocation using the filtered reference table; and
   generating a results table by combining the disaggregated data with the data requiring direct assignment;

wherein at least one of the receiving, applying, disaggregating, or generating is implemented by at least one data processor.

13. The non-transitory computer program product as in claim 12 wherein the values in the driver name column determine the classification of data as data requiring direct assignment or data requiring allocation.

14. The non-transitory computer program product as in claim 12 wherein conditional columns in the base table comprise at least one of:
   a base allocation object column or a base other dimension column,
   wherein the conditional columns in the assignment paths table comprise at least one of: an allocation paths allocation object column and an allocation paths other dimension column.

15. The non-transitory computer program product as in claim 12 wherein applying rules from the assignment table to the reference table comprises:
   joining the assignment paths table to the reference table based on matching values in conditional columns in the reference table and corresponding conditional columns in the assignment paths table; and
   adding a path ID column from the assignment paths table.

16. The non-transitory computer program product as in claim 12 wherein the disaggregating the data requiring allocation using the filtered reference table comprises:
   Disaggregating at least one allocation value from an allocation value column of the intermediary base table into separate weighted components, and
   wherein the disaggregating is based on a weighted breakdown provided by the filtered reference table, and matching values in conditional columns in the intermediary base table and corresponding conditional columns in the filtered reference table.

17. A system comprising:
   at least one data processor; and
   memory storing instructions which, when executed by the at least one data processor, result in operations comprising:
   applying rules from an assignment paths table to a base table, the applying comprising:
      joining the assignment paths table to the base table to generate an intermediary base table, the joining based on matching values in conditional columns in the base table and corresponding conditional columns in the assignment paths table;
   splitting data from the intermediary base table into data requiring direct assignment and data requiring allocation; and
   adding a path identification (ID) column and a driver name column from the assignment paths table;
   applying rules from the assignment paths table to the reference table and generating a filtered reference table;
   disaggregating the data requiring allocation using the filtered reference table; and
   generating a results table by combining the disaggregated data with the data requiring direct assignment.

18. A non-transitory computer program product storing instructions which, when executed by at least one data processor forming part of at least one computing system, result in operations comprising:
   applying rules from an assignment path table to a base table, the applying comprising:
   joining the assignment paths table to a reference table to generate an intermediary reference table, the joining based on matching values in conditional columns in a reference table and corresponding conditional columns in the assignment paths table;
   splitting data from the base table into data requiring direct assignment and data requiring allocation; and
   adding a path ID column from the assignment paths table;
   applying rules from the assignment paths table to the intermediary reference table and generating a filtered reference table;
   disaggregating the data requiring allocation using the a filtered reference table; and
   generating a results table by combining the disaggregated data with the data requiring direct assignment;
   wherein at least one of the receiving, applying, disaggregating, or generating is implemented by at least one data processor.

* * * * *